United States Patent [19]

Baiker et al.

[11] Patent Number: 4,978,513
[45] Date of Patent: Dec. 18, 1990

[54] CATALYST FOR THE OXIDATION OF CARBON COMPOUNDS

[75] Inventors: Alfons Baiker, Opfikon; Daniel Gasser, Schaffhausen, both of Switzerland

[73] Assignee: Lonza Ltd., Gampel/Valais, Switzerland

[21] Appl. No.: 293,442

[22] Filed: Jan. 4, 1989

Related U.S. Application Data

[62] Division of Ser. No. 270,796, Jul. 13, 1988, Pat. No. 4,916,109.

[30] Foreign Application Priority Data

Jul. 14, 1987 [CH] Switzerland .................. 2685/87

[51] Int. Cl.$^5$ .................................... B01D 53/36
[52] U.S. Cl. .................. 423/245.3; 423/213.5; 423/247
[58] Field of Search .................. 423/247, 245.3, 213.5

[56] References Cited

U.S. PATENT DOCUMENTS

| | | | |
|---|---|---|---|
| 670,775 | 3/1901 | Gesner | 423/645 |
| 1,735,763 | 11/1929 | Jaeger | 568/472 |
| 2,744,062 | 5/1956 | Marshall | 204/10 |
| 3,259,324 | 7/1966 | Ball et al. | 241/17 |
| 3,363,846 | 1/1968 | Eck | 241/15 |
| 3,376,107 | 4/1968 | Oka | 423/645 |
| 3,830,756 | 8/1974 | Sanchez et al. | 423/213.5 |
| 3,856,074 | 12/1974 | Kavesh | 164/463 |
| 3,856,513 | 12/1974 | Chen et al. | 148/403 |
| 3,862,658 | 1/1975 | Bedell | 164/463 |
| 3,871,836 | 3/1975 | Polk et al. | 428/656 |
| 3,981,722 | 9/1976 | Ray et al. | 148/401 |
| 3,986,867 | 10/1976 | Masumoto | 148/403 |
| 3,989,517 | 11/1976 | Tanner et al. | 148/403 |
| 3,992,476 | 11/1976 | Rausch | 585/748 |
| 4,018,839 | 4/1977 | Rausch | 585/372 |
| 4,127,510 | 11/1978 | Harrison et al. | 423/213.5 |
| 4,142,571 | 3/1979 | Narasimhan | 164/463 |
| 4,179,581 | 12/1979 | Mitsche et al. | 585/744 |
| 4,197,146 | 4/1980 | Frischmann | 148/304 |
| 4,197,217 | 4/1980 | Gartshore et al. | 423/213.5 |
| 4,201,837 | 5/1980 | Lupinski | 428/457 |
| 4,221,257 | 9/1980 | Narasimhan | 164/463 |
| 4,299,734 | 11/1981 | Fujitani et al. | 423/213.5 |
| 4,300,946 | 11/1981 | Simons | 75/0.5 B |
| 4,304,593 | 12/1981 | Maeland | 75/0.5 R |
| 4,331,739 | 5/1982 | Narasimhan | 428/544 |
| 4,409,410 | 10/1983 | Cosyns et al. | 585/259 |
| 4,572,904 | 2/1986 | Onal | 423/213.5 |
| 4,727,202 | 2/1988 | Franzen et al. | 585/259 |
| 4,735,789 | 4/1988 | Franzen et al. | 423/362 |
| 4,859,434 | 8/1989 | Roberts et al. | 423/245.3 |

FOREIGN PATENT DOCUMENTS

| | | |
|---|---|---|
| 1604924 | 12/1981 | United Kingdom . |
| 0034403 | 8/1981 | European Pat. Off. . |
| 0042309 | 12/1981 | European Pat. Off. . |
| 2555131 | 6/1977 | Fed. Rep. of Germany . |
| 2809837 | of 1978 | Fed. Rep. of Germany . |
| 47636 | 4/1980 | Japan . |
| 57-200565 | 12/1982 | Japan . |
| 209236 | 12/1982 | Japan . |
| 159847 | 9/1983 | Japan . |
| 60-59034 | 4/1985 | Japan . |
| 116744 | 5/1988 | Japan | 423/213.5 |
| 436906 | 10/1935 | United Kingdom | 423/213.5 |

OTHER PUBLICATIONS

Journal of Catalysts, vol. 87, No. 1, pp. 152 to 162 (May, 1984) by Yung-Fang Yu Yao.
Chemical Letters (The Chemical Society of Japan), vol. 2, of 1983, pp. 195 to 198 by Akinon Yokoyama et al.
Ruhl, Robert C., "Materials Science & Engineering", vol. 1, (1967), pp. 313 to 320.
Polesya, et al., Ev. Akad. Navk. SSR, Metal, No. 6, (1973), pp. 173 to 178.

(List continued on next page.)

Primary Examiner—Jeffery E. Russel
Attorney, Agent, or Firm—Fisher, Christen & Sabol

[57] ABSTRACT

New activated palladium zirconium oxide catalysts on the basis of amorphous or crystallized alloys as well as new palladium zirconium oxide precipitation catalysts. The new catalysts are suitable for totally oxidizing carbon monoxide and hydrocarbons.

8 Claims, 3 Drawing Sheets

COMPARISON OF THE ACTIVATION PROPERTIES

OTHER PUBLICATIONS

Ray, et al., Metallurgical Transactions, vol. 3, (Mar. 1972), pp. 627 to 629.
Shibata et al., Journal of Catalysis, 96 (1985), pp. 296 to 298.
Kirk-Othmer, "Encyclopedia of Chemical Technology", 2nd Ed., vol. 11, pp. 224 to 241.
Duwez, Pol. Fizika 2, Supp., 2, (1970), pp. 1.1 to 1.15, 47.1, 47.2 and 48.1.
Duwez et al., Journal of Applied Physics, 31, (1960), pp. 1136 and 1137.
Gubanov, AI, Soviet Physics—Solid State, vol. 2, (1960), pp. 468 to 471.
Herman et al., Journal of Catalysis, 56, (1979), pp. 407 to 429.
Yokoyama et al., Journal of Catalysis, 68, (1981), pp. 355 to 361.
Idemitsu, 103:160098m—Chemical Abstracts.
Pines, Herman, "The Chemistry of Catalytic Hydrcarbon Conversions", Academic Press, (1981), pp. 18 to 23.
Reilly et al., Inorganic Chemistry, vol. 13, No. 1, (1974), pp. 218 to 222.
Butler et al., Fiber Science & Technology, vol. 4, No. 3, (Oct. 1972), pp. 243 to 262.
Chemical & Engineering News, (Nov. 19, 1973), pp. 24 and 25 (CEN).
Masumoto et al., The Science Reports of the Research Institutes, Tohoku University, Series A, vol. 25, No. 6, (Nov. 1975), pp. 232 to 244.
Chemical Abstracts: 97:15437z (1982); 96:13407t (1982); 99:114156e; 101:234320k (1984); 97:186647x (1982); 98:153261j (1983).
Jaschinski, et al., Tech. Mitt, Krupp. Forsch. —Ber. Band 39 (1981), pp. 1 to 12.
Smith et al., Journ. of Catalysis, 83, 238-241 (1983).
Giessen et al., Elsevier Science Publishing Co., (1982), pp. 255-258.
Baiker, Alfons, et al., J. Chem. Soc., Chem. Commun., (1986), No. 12, pp. 930 to 932.
Fieser et al., Organic Chemistry, (1944), pp. 105 and 106.
Armbruster, et al., "J. Chem. Soc., Chem. Commun.", 1986), No. 4, Feb. 15, 1986, pp. 299 to 301.
Schloegl, Robert, "Rapdily Quenched Metals", (1985), pp. 1723 to 1727.
Cocke et al., "Rapidly Quenched Metals", vol. II, (1985), pp. 1497 to 1503.
Brower et al., Nature, vol. 301, Feb. 10, 1983, pp. 497 to 499.
G. V. Smith, et al., "New Horizons in Catalysis", (1981), Elsevier Scientific Publishing Company, pp. 355 to 363.
Cohn, Robert, "Nature", vol. 237, Jan. 23, 1976, pp. 271 to 272.
M. Peuckert and A. Baiker, Faraday Trans. I, 81, 91985), pp. 2707 to 2803.
Y. Shimogaki, H. Komiyama, H. Inoue, T. Masumoto and J. Kimura, Chem. Lett, (1985), pp. 661 to 664.
A. Kawashima and K. Hashimoto, Proc. 4th Int. Conf. on Rapidly Quenched Metals, vol. II, (1982), pp. 1427 to 1430.
M. Hara K. Hashimoto and T. Masumoto, J. Non. Cryst. Solids, 54, (1983), pp. 85 to 100.
J. Yamishita, M. Yoshikawa and T. Funabiki, J. Chem. Soc., Faraday Trans I 81, (1985), pp. 2485 to 2493.
Chemical Abstracts: 103:160098m; 96:172748y; 99:61832p; 99:42210t; 104:54393q; 99:91044a: 92:217951v.
Chaudari, Praveen et al., "Metallic Glass";, pp. 98 to 117.
Hilzinger, H.R., et al. "Preparation Of Metallic Glasses", Int'l Conf. MIT, pp. 71 to 90.
Yoshida, Satohiro, et al., J. Chem. Soc., Chem. Commun. No. 16 (Aug. 15, 1982), pp. 964 and 965.
Komiyama, H., et al., Structure And Properties Of Amorphous Metals II, Suppl. To. Sci. Rep. RITU, A, (March 1980), pp. 217 to 221.
Yokoyama, Akinori, et al., J. of Non-Crystalline Solids, 61 and 62, (1984), pages 619 and 624.
Yokoyama A., et al., Nippon Kagaku Kaishi, 2 (1982), pp. 199 to 205.
Eigenschaften und Anwendungen amorpher Metalle, (1985), 5, pp. 284 to 287.
VITROVAC Amorpher Metalle, pp. 1 to 12.

FIG. I

COMPARISON OF THE ACTIVATION PROPERTIES

ACTIVITY COMPARISON AFTER PRETREATMENT

CATALYST FOR THE OXIDATION OF CARBON COMPOUNDS

This is a divisional of application Ser. No. 220,796, filed on Jul. 13, 1988, now U.S. Pat. No. 4,916,109.

BACKGROUND OF THE INVENTION

1. Field of the Invention

The invention relates to an activated PdZr oxide catalyst as an amorphous or crystalline alloy, a $PdZrO_2$ precipitation catalyst as well as processes for total oxidation of CO, aliphatic and aromatic hydrocarbons as well as aliphatic alcohols with the help of these catalysts. The invention especially relates to the total oxidation of said compounds in oxygen-containing gas streams, e.g., waste gas streams from fossil fuel combustion units.

2. Background Art

It is known to use support-bonded noble metal catalysts for the oxidation of carbon monoxide and hydrocarbons [*Yung-Fang Yu Yao*, J. Catal., 87, 152-162 (1984)]. The process is disadvantageous in that, aside from the fact of the very expensive noble metal catalysts, which make an economical process on a large scale inconceivable, the reaction temperatures as a rule are set high. Therefore, from the energy viewpoint, the process again relative to the economic efficiency and costs is even less favorable.

It is also known to use carbon monoxide in the presence of amorphous metal strips with a composition of $Pd_{35}Zr_{65}$ as the methanization catalyst for CO and $H_2$ [*Yokohama et al.*, Chemistry Letters, The Chemical Society of Japan, 195-198, (1983)].

BROAD DESCRIPTION OF THE INVENTION

The main object of the invention, therefore, is to develop catalysts which do not exhibit said drawbacks of said processes.

The main invention object can be achieved by means of a first class of new activated catalysts of the general formula $Pd_x(ZrO_z)_y$, wherein x is a number between 1 and 99, y is the difference between x and 100 and z is a value between 0.5 and 2.

The main invention object can also be achieved by means of a second class of new $PdZrO_2$ precipitation catalysts with a Pd content between 0.2 and 20 percent by weight produced by the process of:

(a) impregnating $ZrO_2$ with a water-soluble palladium salt, (b) drying the mixture, and (c) reducing the Pd complex with hydrogen.

To repeat, the first class of new catalysts of the invention are activated catalysts of general formula $Pd_x(ZrO_z)_y$, wherein x is a number between 1 and 99, y is the difference between x and 100 and z is a value between 0.5 and 2. Preferably, the activated catalyst has the formula $Pd_{33}(ZrO_2)_{67}$. The activated catalyst is suitably an amorphous or a crystalline alloy.

Production of amorphous alloys is known in the art. An essential feature is that the elements that form the alloys can be premelted under a protective gas, such as, argon. This prealloy is again melted and the melt finally is cooled at cooling rates of suitably $10^{3°}$ to $10^{9°}$ C./s, preferably $10^{6°}$ to $10^{9°}$ C./s. With this "chilling process", an amorphous phase of the alloy is formed. Known processes, listed by way of illustration, are the melt spinning process, the splat cool process, further processes for production of amorphous powders by melting and spraying of the alloy, etc.

According to the invention, crystalline or crystallized alloys of the composition according to the invention can also be used. Such alloys can be produced in the usual way known in the art, i.e., by melting of the initial materials and then permitting them to cool. It is also possible to convert amorphous alloys back to the crystalline state by heating above the crystallization temperature, generally in a high vacuum.

Depending upon the production process, the alloy can be present as strip, pieces of strip, as a molded article from strip or in powder form.

In the unactivated state, the catalyst surface is in a range of 0.01 to 0.1 $m^2/g$.

Before their use as catalyst these alloys according to the invention must first be activated "in situ" or in an oxygen-containing gas stream. Thus, a partial-to-complete oxidation of the zirconium to zirconium oxides of the formula $ZrO_z$, takes place, and z has the above-mentioned meaning. Most of the palladium in the bulk remains oxidatively unchanged in the activation, so that the activated catalyst, as X-ray tests show, consists mainly of palladium particles which are in a $ZrO_z$ matrix.

The phrase "in situ" means that the alloy is flowed over or flowed through by the gas mixture containing the reactants, suitably at temperatures between 150° and 350° C., preferably between 200° and 300° C. After a period of suitably 2 to 400 hours, but generally of 2 to 100 hours, the alloy reaches its full catalytic activity. Shorter activation times, of 0.1 to 2 hours, are achieved by activation in an air stream. For mere activation, an oxygen-containing gas mixture alone can be used instead of the gas mixture to be reacted.

The reactant activation can be characterized by measurement of the specification surface, e.g., according to the BET method. Thus, a $Pd_x(ZrO_z)_y$ catalyst, depending on the activation, has a specific surface of suitably 15 to 60 $m^2/g$.

Another method of characterizing the activation is the measurement of the metal surface, on the basis of the determination of the chemisorption. The $Pd_x(ZrO_z)_y$ catalysts according to the invention have, also depending on the activation, a specific metal surface suitably between 2 and 20 $m^2/g$.

The activated catalysts according to the invention are used for total oxidation of carbon monoxide, of aliphatic and aromatic hydrocarbons as well as aliphatic alcohols in the gas phase. Especially suitable is the process for the total oxidation of said compounds in waste gas streams of fossil fuel combustion units. In this way, the outstanding property of the catalyst according to the invention, namely, the total oxidation of mixtures of said compounds, is stressed.

The aliphatic hydrocarbons can be saturated or unsaturated, substituted or unsubstituted. Suitable representatives of this class of compounds are, for example, butane, pentane, pentene, hexane and octane. Representatives of aromatic hydrocarbons are, for example, benzene, toluene, ethylbenzene and xylene. As aliphatic alcohols there is mentioned shorter-chain compounds such as methanol, ethanol, propanol and butanol, but preferably methanol.

The catalyst according to the invention is especially suitable for the oxidation of carbon monoxide to carbon dioxide and for the total oxidation of methyl alcohol to carbon dioxide and water.

The reaction temperature, i.e., the temperature which is necessary for total oxidation, depends upon the reactant to be oxidized in the gas stream, but suitably is between room temperature and 350° C. For the oxidation of methanol the preferred temperature range is between 50° and 200° C. For the oxidation of carbon monoxide the preferred temperature range is between 100° and 200° C.

The pressure conditions during the reaction generally are not critical, and the operation is suitably performed at pressures between normal pressure and 10 bars, preferably at normal pressure.

The gas velocity is adjusted depending on the reactants. Generally, the gas velocity is useful in a range of 0.05 to 10 Nl/min×g of catalyst.

To repeat, the second class of new catalyst of the invention are PdZrO$_2$ precipitation catalysts with a Pd content between 0.2 and 20 percent by weight produced by the process comprising:

(a) impregnating ZrO$_2$ with a water-soluble palladium salt, (b) drying the mixture, and (c) reducing the Pd complex with hydrogen. According to the invention, these catalysts exhibit a Pd content between 0.2 and 20 percent by weight. Preferably, a catalyst with a Pd content of 1 to 5 percent by weight is used.

The PdZrO$_2$ precipitation catalyst is produced by impregnating a pulverized zirconium oxide with a surface of 10 to 60 m$^2$/g with a palladium salt dissolved in water, drying the moist mixture and reducing the resultant Pd complex with hydrogen.

Palladium chlorides, such as, palladium II chloride, or complexed palladium chlorides, such as, ammonium tetrachloropalladate (II), can be used as the water soluble Pd salts.

The drying of the mixture suitably takes place at 120° to 300° C.

The reduction is advantageously performed in the presence of a hydrogen-nitrogen mixture in a H$_2$:N$_2$ ratio of between 10 to 1 and 0.1 to 1 at temperatures of 200° to 600° C. The temperature control is especially advantageously selected so that the final reduction temperature is reached only after gradual increase.

Precipitation catalysts of this type are used according to the invention also for the oxidation of carbon monoxide, and the total oxidation of aliphatic and aromatic/hydrocarbon as well as aliphatic alcohols in the gas phase. The process is especially suitable for the total oxidation of said compounds in waste gas streams.

The aliphatic hydrocarbons can be saturated or unsaturated, substituted or unsubstituted. Suitable representatives of this class of compounds are, for example, butane, pentane, pentene, hexane and octane. Representatives of aromatic hydrocarbons are, for example, benzene, toluene, ethylbenzene and xylene. As aliphatic alcohols there is mentioned shorter-chain compounds, such as, methanol, ethanol, propanol and butanol, but preferably methanol.

The catalyst according to the invention is especially suitable for the total oxidation of carbon monoxide to carbon dioxide and for the oxidation of methyl alcohol to carbon dioxide and water.

The reaction temperature, i.e., the temperature, which is necessary for total oxidation, depends upon reactants to be oxidized in the gas stream, but suitably is between room temperature and 350° C. For the oxidation of methanol the preferred temperature range is between 50° and 200° C. For the oxidation of carbon monoxide the preferred temperature range is between 100° and 200° C.

The pressure conditions during the reaction generally are not critical, and the operation is performed at pressures between normal pressure and 10 bars, preferably at normal (atmospheric) pressure.

The gas velocity is adjusted depending on the reactants. Generally, the gas velocity is useful in a range of 0.05 to 10 Nl/min×g of the catalyst.

DETAILED DESCRIPTION OF THE INVENTION

The following examples further explain and illustrate the process according to the invention.

EXAMPLE 1

Production of Initial Alloys (a) Production of amorphous initial alloy

A Pd$_{33}$Zr$_{67}$ alloy was produced according to the melt spinning process as the initial alloy for the following tests. Strips with a thickness of 30 microns resulted. The strips were ground for their use as catalysts (particle size range, 0.1 to 5 mm).

(b) Production of crystalline initial alloy

The crystalline initial alloy was produced by crystallizing out amorphous initial alloy produced in subsection (a) in a high vacuum at a temperature of 600° C.

(c) Production and activation of a Pd-ZrO$_2$ precipitation catalyst

The precipitation catalyst Pd/ZrO$_2$ (1 percent by weight of Pd) was formed according to the following formula.

The zirconium dioxide present as granulate (Harshaw ZR-0304 T$\frac{1}{8}$) was finely pulverized. For the impregnation of the powder with 1 percent by weight of Pd, 0.2674 g of (NH$_4$)$_2$PdCl$_4$ per 10 g of ZrO$_2$ was dissolved in a little water. The selected amount of water was just large enough that the zirconium oxide was completely impregnated. Then the moist mixture was dried overnight at 120° C. The Pd complex was reduced in a hydrogen atmosphere. The reduction conditions were selected as follows:

H$_2$:N$_2$=1:10

15 h at 200° C., then 1 h at 300° C., then 1 h at 400° C.

EXAMPLE 2

Activation of the Initial Alloy (a) "In situ" activation of an amorphous Pd$_{33}$Zr$_{67}$ alloy Pd$_{33}$Zr$_{67}$ catalysts (0.30 g) in the form of chips of a particle size of 0.1 to 1 mm and a surface of 0.02 m$^2$/g were activated "in situ" in a reaction flow-through apparatus, in a microreactor made of Pyrex glass, with an N$_2$/O$_2$/CO gas mixture of 0.17 percent by volume of CO, 0.17 percent by volume of O$_2$ at 202° C., 242° C.

and 282° C. The gas flow rate was always 150 Nml/min and the concentration of $O_2$ and CO was 1700 ppm each. The tests were conducted at normal pressure (activation times, see FIG. 1).

(b) Activation of an amorphous $Pd_{33}Zr_{67}$ alloy in an air stream

The catalysts (0.3 g) were activated in a reaction flow-through apparatus in an air stream at a gas velocity of 50 Nml/min at normal pressure and a temperature of 280° C. over 1 hour.

(c) "In situ" activation of a crystalline $Pd_{33}Zr_{67}$ alloy $Pd_{33}Zr_{67}$ catalysts (0.30 g) in the form of chips of 0.1 to 1 mm in size and a surface of 0.02 m²/g were activated "in situ" in a reaction flow-through apparatus, in a microreactor made of Pyrex glass, with an $N_2/O_2/CO$ gas mixture at 280° C. The gas flow rate was always 150 Nml/min and the concentration of $O_2$ and CO was 1700 ppm each. The tests were conducted at normal pressure (activation time, see FIG. 1).

(d) Properties of the activated initial alloy in CO oxidation

Figure 1:
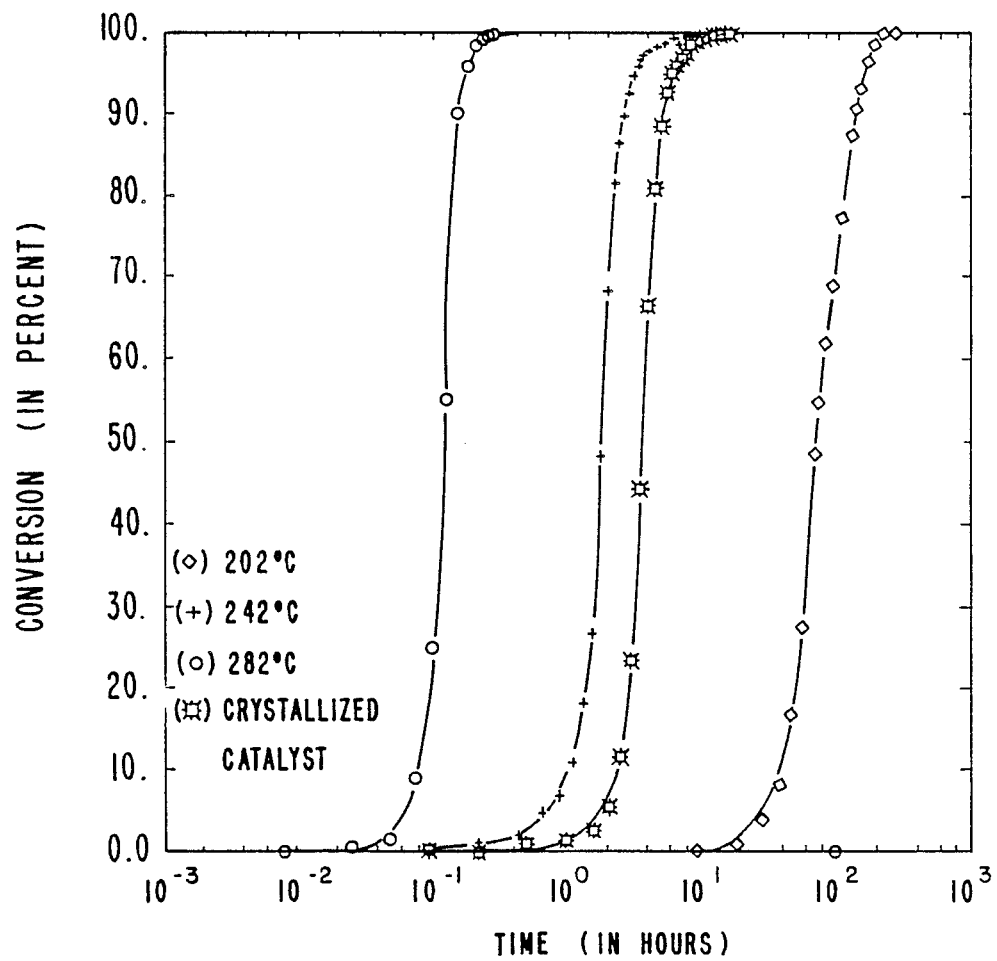
FIG. 1 is an activity-time diagram.

FIG. 1 shows in summary with an activity-time diagram how the different activation is reflected in the CO oxidation of an amorphous and a crystalline Pd—Zr alloy.

The "in situ" conditioning resulted in each case in a higher activity.

When the properties of the amorphous alloy were compated at different temperatures, it was seen that the activation takes place faster at increasing temperature. The activation took place parallel with the oxidation of the zirconium. X-ray examinations of the bulk of the catalysts showed that these consisted of palladium particles, which were embedded in a matrix of Zr oxides. The activation of the crystalline alloy takes place much slower.

For the activation up to the stationary activity the following times can be indicated:

| In situ activation | Oxidation time |
|---|---|
| amorphous 202° C. | about 360 h |
| amorphous 242° C. | about 65 h |
| amorphous 282° C. | about 10 h |
| crystalline 282° C. | about 150 h |

Table 1 shows the resultant enlarging of the BET surface during the "in situ" activation of the amorphous sample. Except for the amorphous sample, the surface area of all catalysts (according to activation) were determined by adsorption of nitrogen.

TABLE 1

| | Specific Surface According to BET | | | | | |
|---|---|---|---|---|---|---|
| | amorph., in situ | amorph., in situ | amorph., in situ | amorph. comparison, air | support catalyst | cryst., in situ |
| Act Temp. | 202° C. | 242° C. | 282° C. | 280° C. | | 280° C. |
| $A_{BET}$, (m²/g) | 26.9 | 29.9 | 45.9 | 24.2 | 45.5 | 20.2 |

Note:
$A_{BET}$ of amorphous initial material: 0.031 m²/g (adsorption measured with krypton)

Table 2 shows the free metal surface determined by chemisorption measurements.

TABLE 2

| | Metal Surface From Chemisorption Measurements | | | | | |
|---|---|---|---|---|---|---|
| | amorph., in situ | amorph., in situ | amorph., in situ | amorph. comparison, air | support catalyst | cryst., in situ |
| Act Temp. | 202° C. | 242° C. | 282° C. | 280° C. | | 280° C. |
| $A_{Pd}$, m²/g | 3.9 | 5.5 | 6.9 | 18.5 | 0.52 | 6.9 |
| Dispersion, % | 2.7 | 3.9 | 5.9 | 13.2 | 11.6 | 5.1 |

Notes:
$A_{Pd}$ the metal surface of the palladium. The dispersion in % shows in percent the portion of the Pd surface atom relative to the total number of metal atoms.

To the four catalysts represented in FIG. 1, two others were added for the tests in Tables 1 and 2, namely:
(a) Support catalyst with 1 percent by weight of Pd on $ZrO_2$
(b) Activated catalyst in the air stream at 280° C.

EXAMPLE 3

Total Oxidation of CO with an Amorphous, Crystalline and Support Catalyst

Figure 2:
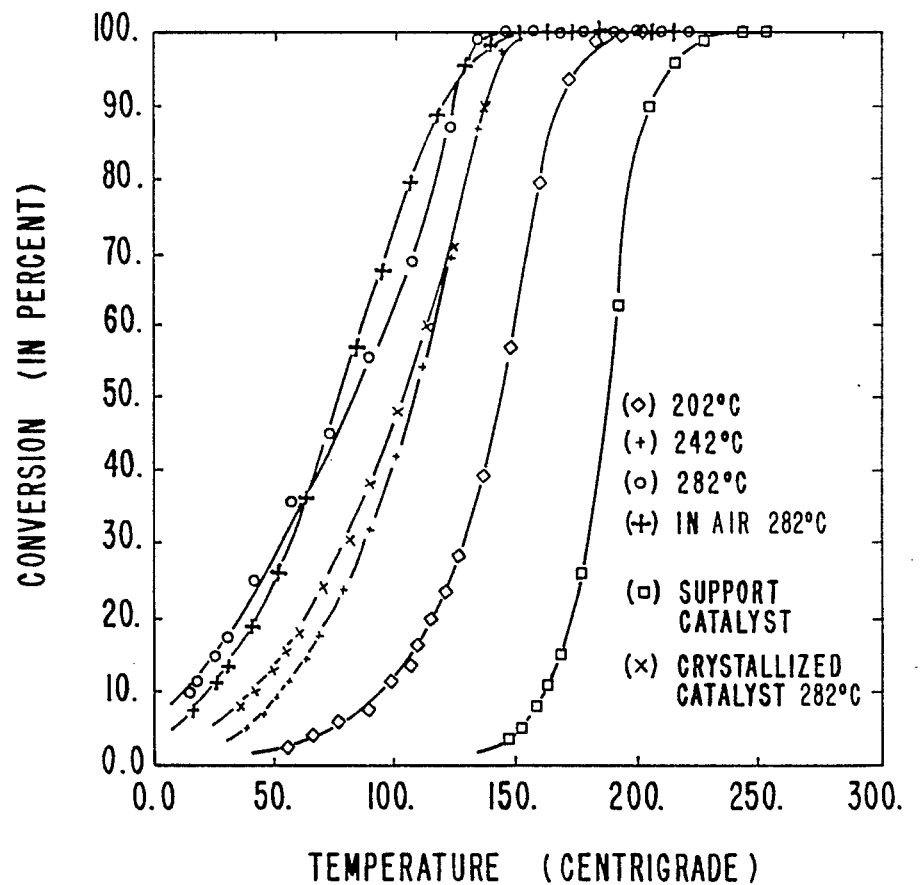
FIG. 2 is a diagram of conversions versus temperature.

After the completed activation phase, the reaction temperature was gradually reduced and the respective conversion recorded (see FIG. 2). The gas velocity was always 150 Nml/min and the concentration of $O_2$ and CO was 1700 ppm each. The tests were conducted at normal pressure.

From FIG. 2, it was established, that for the catalysts activated "in situ", there is a tendency of increased catalytic activity with an increase of the temperature used in the in situ activation of the catalysts. Thus, an amorphous catalyst activated "in situ" at 282° C. was more active than a crystalline catalyst activated at 280° C., the latter was again more active than an amorphous catalyst activated "in situ" at 242° C. and the latter again was more active than an amorphous catalyst activated "in situ" at 202° C. It was clearly seen that the support catalyst exhibited the least activity per gram.

By the determination of the free metal surface, the activity per catalytically active surface atom was indicated. The reaction rate r was defined as follows:

$$r = \text{convension } CO \rightarrow CO_2/[\text{atom}_{Pd}\cdot s]$$

Figure 3:
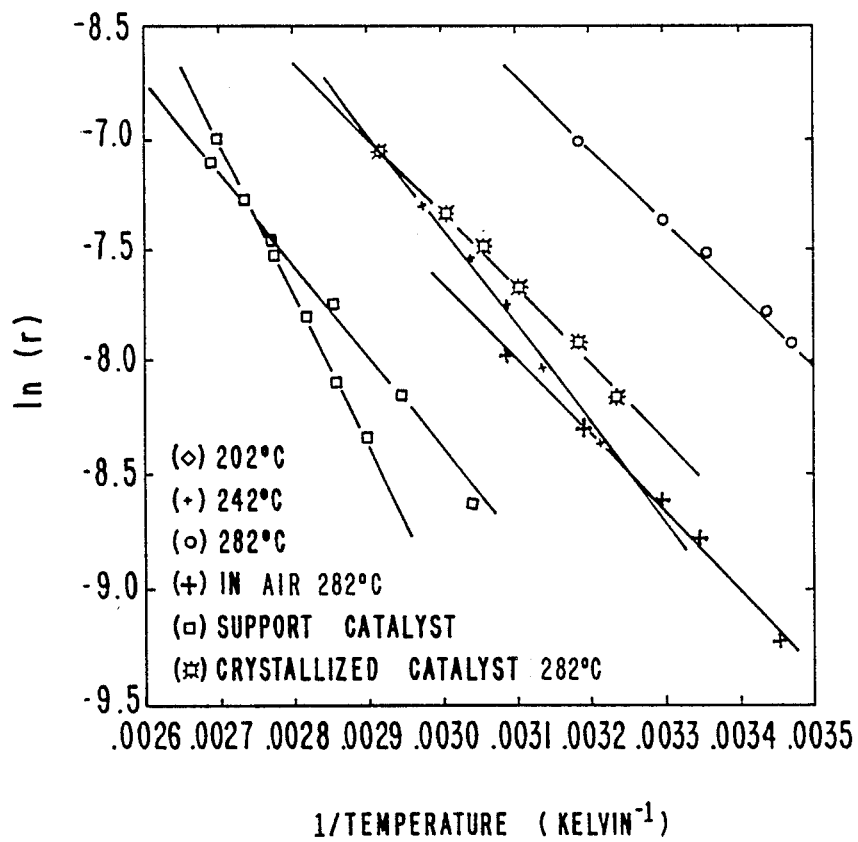
FIG. 3 is a diagram of activities.

The activity plots contained in the differential conversion are shown in FIG. 3. From FIG. 3, it is seen that an activity property, dependent on the pretreatment, appeared. The discrepancy between support catalyst and the amorphous alloy, which started at 280° C., is the most obvious. At $1/T = 0.003$ ($=60°$ C.), a 14 times greater center activity of the catalyst activated "in situ" at 280° C. relative to the support catalyst appeared. Thus, it appeared that the type of production of the Pd/ZrO$_2$ affected the nature of the active centers.

EXAMPLE 4

Total Oxidation of Methanol

A 5 percent by volume of methanol-air mixture was sent at 50° C. over a bed of 0.2 g of an amorphous Pd$_{33}$(ZrO$_2$)$_{67}$ catalyst in the form of chips of particle size of 0.1 to 1 mm (reaction flow-through apparatus). The gas flow rate in this case were 300 Nml/min. Normal pressure was maintained. In the gas stream at the outlet of the apparatus only CO$_2$ and H$_2$O could be detected, i.e., the methanol was quantitatively totally oxidized.

What is claimed is:

1. Process for the total oxidation of at least one compound selected from the class consisting of carbon monoxide, aliphatic hydrocarbons, aromatic hydrocarbons and aliphatic alcohols, comprising reacting the at least one compound in an oxygen-containing gas stream in the presence of an activated catalyst of the general formula Pd$_x$(ZrO$_z$)$_y$, wherein x is a number between 1 and 99, y is the difference between x and 100 and z is a value between 0.5 and 2, in the form of a crystalline or amorphous alloy, at a temperature between room temperature and 350° C. and at a pressure from normal pressure to 10 bars.

2. Process according to claim 1 for the total oxidation of carbon monoxide, wherein an air stream, containing 100 ppm to 50 percent by volume of carbon monoxide, is conducted over the activated Pd$_x$(ZrO$_z$)$_y$ catalyst in the form of a crystalline or amorphous alloy, at a temperature between room temperature and 350° C. and at a pressure from normal pressure to 10 bars.

3. Process according to claim 2 wherein the temperature is between 100° and 200° C., and the pressure is normal pressure.

4. Process according to claim 1 for the total oxidation of methyl alcohol, wherein an air stream, containing 100 ppm to 7 percent by volume or more than 36 percent by volume of methyl alcohol, is conducted over the activated Pd$_x$(ZrO$_z$)$_y$ catalyst in the form of crystalline or amorphous alloy, at a temperature between room temperature and 350° C. and a pressure from normal pressure to 10 bars.

5. Process according to claim 4 wherein the temperature is between 50° and 200° C., and the pressure is normal pressure.

6. Process for the total oxidation of at least one compound selected from the class consisting of carbon monoxide, aliphatic hydrocarbons, aromatic hydrocarbon and aliphatic alcohols, comprising reacting the at least one compound in an oxygen-containing gas stream in the presence of an PdZrO$_2$ precipitation catalyst, at a temperature between room temperature and 350° C. and a pressure from normal pressure to 10 bars the PdZrO$_2$ precipitation catalyst having a Pd content between 0.2 and 20 percent by weight and having been produced by the process comprising:
    (a) impregnating ZrO$_2$ with a water-soluble palladium salt,
    (b) drying the mixture, and
    (c) reducing the Pd complex with hydrogen.

7. Process according to claim 6 for the total oxidation of carbon monoxide, wherein an air stream, containing 100 ppm to 50 percent by volume of carbon monoxide, is conducted over the activated PdZrO$_2$ precipitation catalyst of claim 13, at a temperature between room temperature and 350° C. and a pressure from normal pressure to 10 bars.

8. Process according to claim 7 wherein the temperature is between 100° and 200° C., and the pressure is normal pressure.

* * * * *